UNITED STATES PATENT OFFICE.

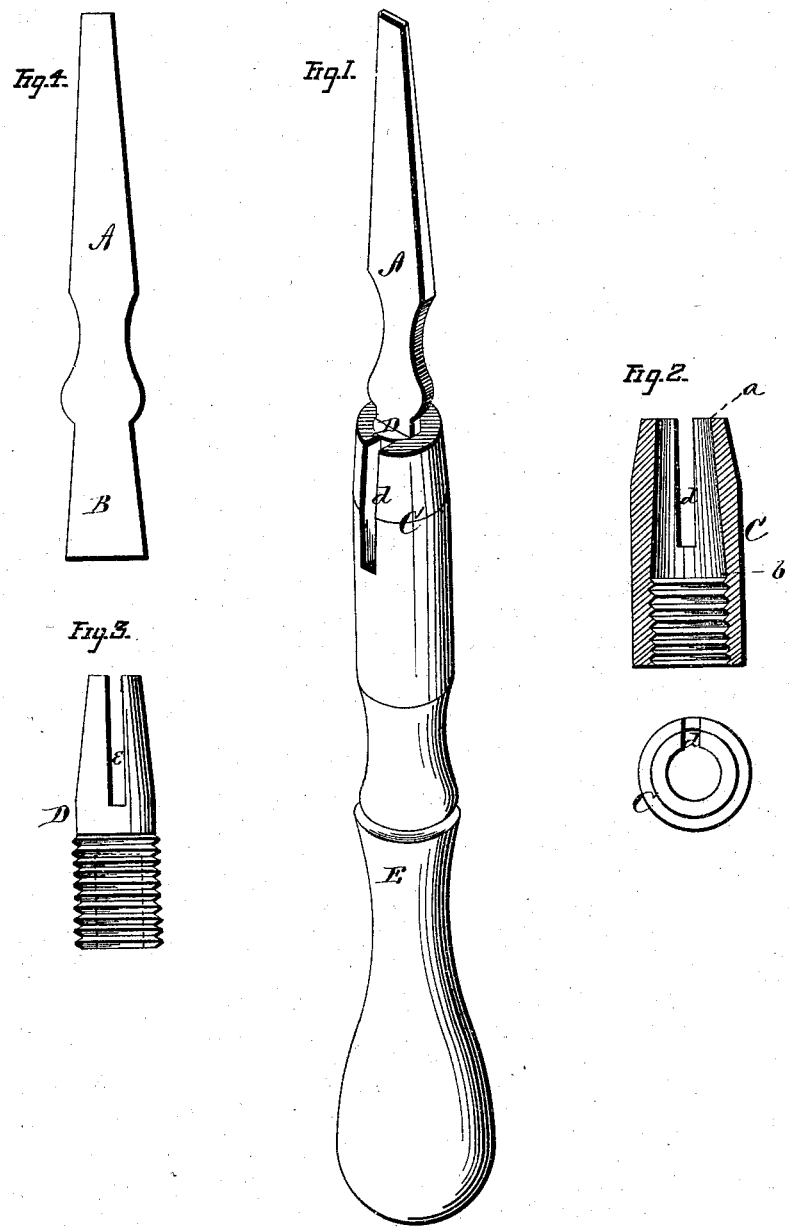

WILLIAM H. McCOY, OF MILLER'S FALLS, MASSACHUSETTS.

IMPROVEMENT IN TOOL-HANDLES.

Specification forming part of Letters Patent No. 138,423, dated April 29, 1873; application filed December 7, 1872.

*To all whom it may concern:*

Be it known that I, WILLIAM H. McCOY, of Miller's Falls, in the county of Worcester and in the State of Massachusetts, have invented certain new and useful Improvements in Tool-Handle; and do hereby declare that the following is a full, clear, and exact description thereof, reference being had to the accompanying drawing, and to the letters of reference marked thereon making a part of this specification.

The nature of my invention consists in the construction and arrangement of tool-handle, as will be hereinafter more fully set forth.

In order to enable others skilled in the art to which my invention appertains to make and use the same, I will now proceed to describe its construction and operation, referring to the annexed drawing, in which—

Figure 1 is a perspective view of my tool-handle with a screw-driver inserted in the same; and Figs. 2, 3, and 4 are detached views of the parts.

A represents a screw-driver blade, provided with a shank, B, which is tapering, being about one-half of an inch wide at the top and five-eighths at the bottom. C represents a metal sleeve, having female screw-threads at its lower end, and its upper end tapering on the inside from $a$ to $b$, corresponding with the taper of the shank B. The nut C is provided with a slot, $d$, cut on one side, as shown in Figs. 1 and 2, said slot being of the same width and length as the shank. D represents the stock, which is tapered and threaded to fit in the nut C, and has a slot, $e$, in which the shank B fits exactly. This stock is drilled and threaded in its lower or base end to receive a handle, E, which may be of either wood or metal. The slot $e$ in the stock is cut clear across the diameter. The nut C is screwed onto the stock D until both ends are just even, when the two slots $d$ and $e$ will stand at right angles with each other. The nut C is then turned one-quarter around, when said slots will be in position to receive the shank of the blade. The shank is then inserted in the slot $e$ through the slot $d$, and the nut C then turned down one-quarter around. Then the taper of the inside of the nut C fits the shank of the tool, and forces it to the bottom of the slot $e$ in the stock D, said slot preventing it from turning around. The taper on the inside of the nut prevents it from being pulled out. Any tool may be held in this handle by providing the same with a shank, B, as above described.

Having thus fully described my invention, what I claim as new, and desire to secure by Letters Patent, is—

The slotted tapering stock D, and the slotted tapering sleeve or nut C, in combination with a tool provided with a tapering shank, B, all substantially as and for the purposes herein set forth.

In testimony that I claim the foregoing I have hereunto set my hand and seal this 19th day of November, 1872.

WM. H. McCOY. [L. S.]

Witnesses:
C. L. EVERT,
C. F. RICHARDSON.